(12) United States Patent
Matsuda et al.

(10) Patent No.: US 9,623,441 B2
(45) Date of Patent: Apr. 18, 2017

(54) METHOD FOR MANUFACTURING LONG LAMINATED POLARIZING PLATE AND LONG LAMINATED POLARIZING PLATE

(75) Inventors: Shoichi Matsuda, Ibaraki (JP);
Yoshiaki Asanoi, Ibaraki (JP);
Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 91 days.

(21) Appl. No.: 13/883,904

(22) PCT Filed: Aug. 17, 2012

(86) PCT No.: PCT/JP2012/070918
§ 371 (c)(1),
(2), (4) Date: May 7, 2013

(87) PCT Pub. No.: WO2013/061673
PCT Pub. Date: May 2, 2013

(65) Prior Publication Data
US 2013/0235457 A1    Sep. 12, 2013

(30) Foreign Application Priority Data

Oct. 27, 2011  (JP) .................................. 2011-236202
Aug. 6, 2012   (JP) .................................. 2012-174090

(51) Int. Cl.
*B05D 5/06* (2006.01)
*B05D 3/12* (2006.01)
*G02B 5/30* (2006.01)

(52) U.S. Cl.
CPC ................. *B05D 5/06* (2013.01); *B05D 3/12* (2013.01); *G02B 5/30* (2013.01); *G02B 5/3016* (2013.01); *G02B 5/305* (2013.01)

(58) Field of Classification Search
CPC ......... G02F 1/133531; G02F 1/133541; G02F 1/13363; G02F 1/133634; G02F 1/133638;
(Continued)

(56) References Cited

U.S. PATENT DOCUMENTS 5,587,821 A  * 12/1996  Nakanishi et al. ........... 349/118
7,638,611 B2 * 12/2009  Matsuda et al. .............. 534/836
(Continued)

FOREIGN PATENT DOCUMENTS

CN    101105548 A    1/2008
JP    2000-9912 A    1/2000
(Continued)

OTHER PUBLICATIONS

Chinese Office Action dated Sep. 12, 2014, issued in corresponding Chinese Application No. 201280003643.0; w/English Translation. (20 pages).
(Continued)

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

It is an object of the invention to provide a method for manufacturing a long laminated polarizing plate having a long polarizing coating formed by coating directly on a long retardation film and to provide such a long laminated polarizing plate. The present invention relates to a method for manufacturing a long laminated polarizing plate comprising a long retardation film having a slow axis in its longitudinal direction and a long polarizing coating placed on the retardation film and having an absorption axis or a transmission axis in an in-plane direction at an angle of 25 to 65° to the slow axis direction of the long retardation film.

11 Claims, 2 Drawing Sheets

(58) Field of Classification Search
CPC .............. G02F 1/1337; G02F 1/13378; G02F 1/133784; G02B 5/30; G02B 5/3016; G02B 5/3025; G02B 5/3083; G02B 5/32
USPC ............ 359/483.01, 485.01, 485.03, 487.01, 359/487.02, 487.06, 489.01, 489.06, 359/489.07; 349/96–103, 122–126, 191
See application file for complete search history.

(56) References Cited

U.S. PATENT DOCUMENTS

| | | |
|---|---|---|
| 2004/0066482 A1 | 4/2004 | Tanaka |
| 2005/0219449 A1 | 10/2005 | Tanaka |
| 2008/0049179 A1 | 2/2008 | Kawamoto et al. |
| 2009/0017203 A1 | 1/2009 | Hada et al. |

FOREIGN PATENT DOCUMENTS

| | | |
|---|---|---|
| JP | 2002-022944 A | 1/2002 |
| JP | 2004-170454 A | 6/2004 |
| JP | 2005-300877 A | 10/2005 |
| JP | 2006-235611 A | 9/2006 |
| JP | 2006-337892 A | 12/2006 |
| JP | 2008-242216 A | 10/2008 |
| JP | 2008-242467 A | 10/2008 |
| JP | 2009-251288 A | 10/2009 |

OTHER PUBLICATIONS

Intenational Search Report for PCT/JP2012/070918, Mailing Date of Nov. 6, 2012.

Notification of Transmittal of Translation of the International Preliminary Report on Patentability (Form PCT/IB/338) of International Application No. PCT/JP2012/070918, mailing date of May 8, 2014, with Forms PCT/IB/373 and PCT/ISA/237.

Korean Office Action dated Jun. 20, 2014, issued in corresponding Korean Patent Application No. 10-2013-7011672, w/English translation.

Taiwanese Office Action dated Jun. 3, 2014, issued in Taiwanese Patent Application No. 101130984, w/English translation (8 pages).

Office Action dated Feb. 26, 2015, issued in corresponding Korean Patent Application No. 10-2013-7011672, with English Translation (8 pages).

Notice of Final Rejection dated Aug. 31, 2015, issued in counterpart Korean Patent Application No. 10-2013-7011672, w/ English translation (6 pages).

Office Action dated May 26, 2016, issued in Japanese Application No. 2012-174090, with English translation (5 pages).

Office Action dated Oct. 24, 2016, issued in counterpart Korean Patent Application No. 10-2013-7011672, with English translation. (16 pages).

* cited by examiner (a)

(b)

(a)

(b)

METHOD FOR MANUFACTURING LONG LAMINATED POLARIZING PLATE AND LONG LAMINATED POLARIZING PLATE

TECHNICAL FIELD

The invention relates to a method for manufacturing a long laminated polarizing plate including a long retardation film and a long polarizing coating and also relates to a long laminated polarizing plate.

BACKGROUND ART

A known example of a laminated polarizing plate is a circularly polarizing plate including a linearly polarizing plate and a retardation film placed thereon and having an in-plane retardation of ¼ wavelength (also referred to as "λ/4 plate"). For example, such a circularly polarizing plate is used in liquid crystal displays, organic electroluminescence (EL) displays, etc.

There are known various methods for manufacturing a circularly polarizing plate. For example, a known method includes forming a laminate of a linearly polarizing film and a λ/4 plate made of a piece of obliquely stretched polymer film to produce a circularly polarizing plate in the form of a roll (see for example Patent Document 1). Such a circularly polarizing plate can be continuously produced using rollers and thus can be produced with high productivity.

Unfortunately, the manufacturing method disclosed in Patent Document 1 involves bonding the linearly polarizing film and the λ/4 plate together with an adhesive or the like. At present, there is no known long laminated polarizing plate having a polarizing coating formed directly on a retardation plate such as a λ/4 plate or no known method for manufacturing such a long laminated polarizing plate.

PRIOR ART DOCUMENT

Patent Document

Patent Document 1: JP-A-2002-22944

SUMMARY OF THE INVENTION

Problems to be Solved by the Invention

It is an object of the invention to provide a method for manufacturing a long laminated polarizing plate having a long polarizing coating formed by coating directly on a long retardation film and to provide such a long laminated polarizing plate.

Means for Solving the Problems

As a result of earnest study in view of the problems, it has been found that a process including rubbing a long retardation film with an Nz coefficient of 1.5 or less in a specific direction while feeding the long retardation film, forming a coating of a liquid crystal compound solution in an isotropic phase state on the rubbed surface of the long retardation film, and solidifying the coating can orient the molecules of the liquid crystal compound in a direction substantially parallel to the rubbing direction and can form a long polarizing coating directly on the long retardation film with no adhesive or the like interposed therebetween.

The present invention relates to a method for manufacturing a long laminated polarizing plate comprising a long retardation film having a slow axis in its longitudinal direction and a long polarizing coating placed on the retardation film and having an absorption axis or a transmission axis in an in-plane direction at an angle of 25 to 65° to the slow axis direction of the long retardation film, the method comprising the steps:

(A) preparing a long retardation film having a slow axis in its longitudinal direction and having an Nz coefficient of 1.5 or less, wherein the Nz coefficient is expressed by the formula $(n_x-n_z)/(n_x-n_y)$, wherein $n_x$ is a maximum in-plane refractive index of the film, $n_y$ is an in-plane refractive index of the film in a direction perpendicular to the direction in which $n_x$ is obtained, and $n_z$ is a refractive index of the film in its thickness direction;

(B) rubbing the long retardation film, which is obtained in the step (A), in an in-plane direction at an angle of 20 to 70° to the longitudinal direction while feeding the long retardation film; and (C) forming a coating of a liquid crystal compound solution in an isotropic phase state on the rubbed surface of the long retardation film obtained in the step (B) and solidifying the coating to form a long polarizing coating in which the liquid crystal compound is oriented.

The manufacturing method of the invention can orient the molecules of the liquid crystal compound in a direction substantially parallel to the rubbing direction and can form a long polarizing coating directly on the long retardation film. Thus, the long laminated polarizing plate obtained by the manufacturing method of the invention includes the long retardation film and the long polarizing coating placed directly on the long retardation film with no adhesive layer interposed therebetween.

In the manufacturing method of the invention, the liquid crystal compound solution in an isotropic phase state is preferably a lyotropic liquid crystal compound solution diluted to a concentration lower than an isotropic-phase-to-liquid-crystalline-phase transition concentration. According to this feature, the solvent can be removed by drying so that phase transition can occur to cause the orientation of the liquid crystal compound, which makes it possible to simplify the manufacturing process.

In the manufacturing method of the invention, the rubbing in the step (B) is preferably performed by bringing a rotating rubbing roller into contact with the long retardation film being fed. According to this feature, the rubbing direction can be controlled by controlling the direction and the rotational speed of the rubbing roller, and the rubbing can be uniformly performed.

The invention also relates to a long laminated polarizing plate, comprising:

a long retardation film having a slow axis in its longitudinal direction; and a long polarizing coating having an absorption axis or a transmission axis in an in-plane direction at an angle of 25 to 65° to the slow axis direction of the long retardation film, wherein the long retardation film has an Nz coefficient of 1.5 or less, wherein the Nz coefficient is expressed by the formula $(n_x-n_z)/(n_x-n_y)$, wherein $n_x$ is a maximum in-plane refractive index of the film, $n_y$ is an in-plane refractive index of the film in a direction perpendicular to the direction in which $n_x$ is obtained, and $n_z$ is a refractive index of the film in its thickness direction, the long retardation film has a surface rubbed in an in-plane direction at an angle of 20 to 70° to the longitudinal direction, and the long polarizing coating is formed by coating directly on the rubbed surface of the long retardation film.

The long laminated polarizing plate of the invention can be made thinner because it has no adhesive layer between the long retardation film and the long polarizing coating placed thereon.

MODE FOR CARRYING OUT THE INVENTION

Figure 1:
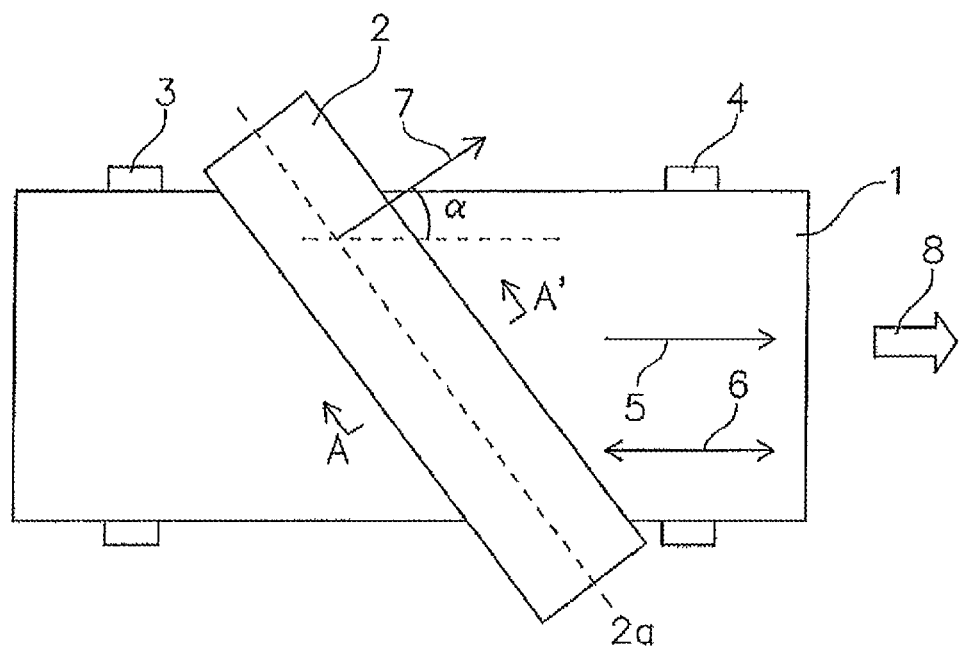
FIG. 1(a) is a schematic diagram showing an embodiment of the manufacturing method of the invention.
FIG. 1(b) is a cross-sectional view along the A-A' line in FIG. 1(a)
Figure 1:
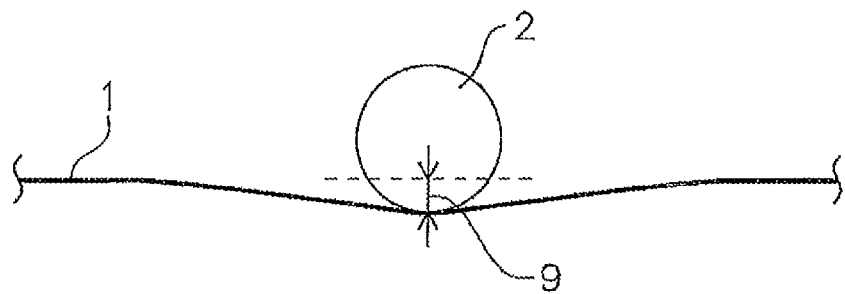

1. Method for Manufacturing Long Laminated Polarizing Plate

The invention is directed to a method for manufacturing a long laminated polarizing plate. The long laminated polarizing plate includes a long retardation film having a slow axis in its longitudinal direction and a long polarizing coating placed on the long retardation film and having an absorption axis or a transmission axis in an in-plane direction at an angle of 25 to 65° to the slow axis direction of the long retardation film. The method includes the steps (A), (B), and (C) described below.

(1) Step (A)

The step (A) is the step of preparing a long retardation film having a slow axis in its longitudinal direction and having an Nz coefficient of 1.5 or less, wherein the Nz coefficient is expressed by the formula (nx−nz)/(nx−ny), wherein nx is the maximum in-plane refractive index of the film, ny is the in-plane refractive index of the film in a direction perpendicular to the direction in which nx is obtained, and nz is the refractive index of the film in its thickness direction.

Such a long retardation film is used as a substrate to which the liquid crystal compound solution described below is to be applied. The use of such a substrate makes it possible to orient the molecules of the liquid crystal compound in such a manner that the direction of their long axis (the direction of the absorption axis represented by 12 in FIG. 2(b)) is substantially parallel to the rubbing direction (represented by 7 in FIG. 2(b)). In this context, the term "substantially parallel" means that the angle between the long axis direction and the rubbing direction is about 0°±5°.

Some types of liquid crystal compounds are oriented in such a manner that the direction of their molecular long axis is substantially perpendicular to the rubbing direction. In this case, the molecules are oriented in such a manner that the direction of their short axis (the direction of their transmission axis) is substantially parallel to the rubbing direction. In this context, the term "substantially parallel" means that the angle between the short axis direction and the rubbing direction is about 0°±5°.

The Nz coefficient of the long retardation film is 1.5 or less, preferably from 0 to 1.2, more preferably from 0 to 0.5. Thus, examples of the long retardation film include long retardation films satisfying the relations nx>ny>nz, nx>ny=nz, nx>nz>ny, and nz=nx>ny, respectively. When the Nz coefficient is 1.5 or less, the in-plane orientation of the molecules that form the long retardation film is relatively small, which suggests that the liquid crystal compound can easily move so that the long axis direction (or short axis direction) of the molecules of the liquid crystal compound can be oriented substantially parallel to the rubbing direction.

Means for preparing the long retardation film is typically a method of stretching a long polymer film in such a manner that it can have a slow axis in its longitudinal direction. The Nz coefficient can be adjusted to an appropriate value by controlling the stretch ratios in the lengthwise (longitudinal) direction and in the transverse direction in the process of stretching the long polymer film. For example, a larger Nz coefficient can be obtained by stretching in the longitudinal direction and stretching at a higher stretch ratio in the transverse direction, and a smaller Nz coefficient can be obtained by stretching in the longitudinal direction and stretching at a lower stretch ratio in the transverse direction or shrinking in the transverse direction. The stretch ratio may be appropriately determined depending on the type of the film material used or the desired Nz coefficient.

The long retardation film may be made of any material capable of providing an Nz coefficient in the above range. Examples of such a material include, but are not limited to, cycloolefin resin, cellulose resin, acrylic resin, polycarbonate resin, polyester resin, etc. In particular, cycloolefin resin is preferred, and norbornene resin is more preferred.

The thickness of the long retardation film is preferably, but not limited to, 20 to 200 μm.

In the manufacturing method of the invention, the long polarizing coating may be placed on the long retardation film with no adhesive layer interposed therebetween. However, an adhesion facilitating layer, such as a polyurethane resin layer, with a thickness of few microns may be formed on the surface of the long retardation film so that the long retardation film can have improved adhesion to the long polarizing coating.

When a long circularly polarizing plate is obtained, the in-plane retardation {(nx−ny)×(thickness)} of the long retardation film is preferably from 120 to 160 nm, more preferably from 130 to 150 nm. When the long polarizing coating described below is deposited on the long retardation film so that the angle between the absorption or transmission axis of the polarizing coating and the slow axis of the retardation film is an angle of 25 to 65°, a long elliptically or circularly polarizing plate can be obtained. The long retardation film may be a single layer or composed of a plurality of layers. The long retardation film may also contain any other layer such as a pressure-sensitive adhesive layer.

(2) Step (B)

Figure 2:
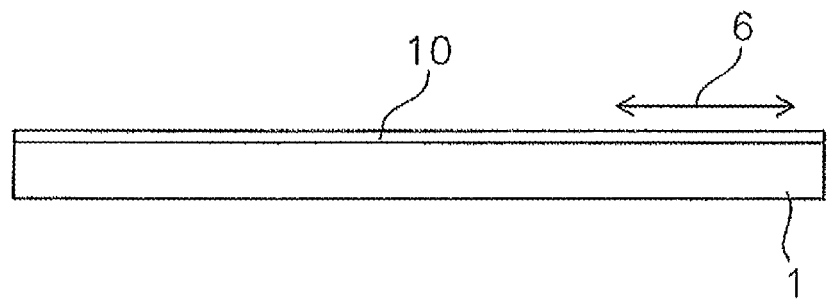
FIG. 2(a) is a cross-sectional view showing an embodiment of the long laminated polarizing plate of the invention.
FIG. 2(b) is a plan view schematically showing an embodiment of the long laminated polarizing plate of the invention.
Figure 2:
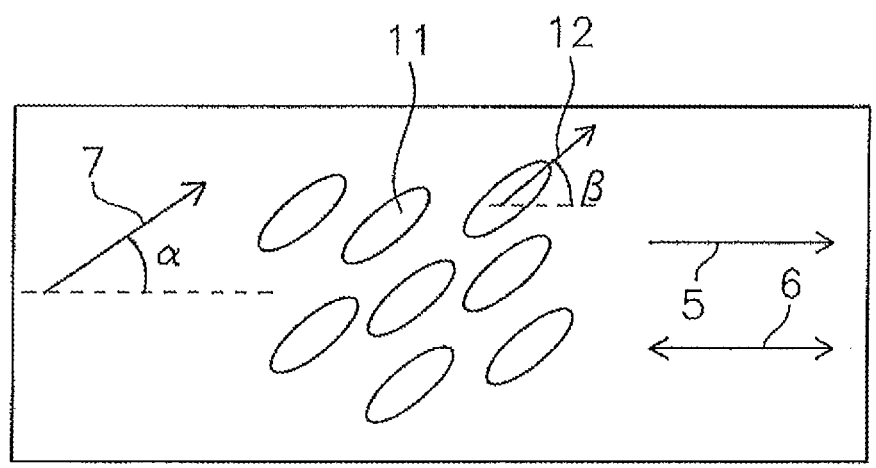

As shown in FIG. 1 or 2, the step (B) is the step of rubbing the long retardation film 1, which is obtained in the step (A), in an in-plane direction at an angle of 20 to 70° (angle α in the drawing) to the longitudinal direction 6 while feeding the long retardation film 1 (in a feed direction 8). In this step, the rubbing is a process of rubbing the surface of the long retardation film 1 with a rubbing cloth or the like for the orientation of the liquid crystal molecules 11 described below.

A feature of the invention is that the liquid crystal molecules 11 are oriented in a direction coincident with the rubbing direction 7. In some cases, however, completely parallel or perpendicular relationship cannot be achieved. Thus, the rubbing direction 7 should be set wider, specifically, set in the range of the desired long polarizing coating 10 absorption or transmission axis angle ±5° (namely, in the range of 20 to 70°) so that the resulting long polarizing coating 10 can have an absorption or transmission axis in either one in-plane direction at an angle of 25 to 65° to the slow axis direction 5 of the long retardation film 1.

A preferred embodiment of the rubbing method is more specifically described with reference to FIG. 1(a). As mentioned above, the rubbing is performed while the long retardation film 1 is fed. In the process of feeding the long retardation film 1, a first guide roller 3 and a second guide roller 4 support the long retardation film 1 while they are rotating in contact with the back surface of the long retardation film 1. The first guide roller 3 and the second guide roller 4 may be of any type or size without limitation. In general, they are made of rubber or metal and 10 to 500 mm in diameter. The first guide roller 3 and the second guide roller 4 may be the same or different.

The rubbing is performed using a rubbing roller 2, which comes into contact with the front surface of the long retardation film 1 being fed. The rubbing roller 2 is configured to be movable up and down in the vertical direction, so that the predetermined angle and the pushing depth described below are adjustable.

The predetermined angle of the rubbing roller 2 refers to the angle between the rotation axis 2a of the rubbing roller 2 and the longitudinal direction (namely, feed direction) of the long retardation film 1, which is set at 90°+α (α=20 to 70°). When the angle between the rotation axis 2a and the longitudinal direction of the long retardation film 1 is in this range, the rubbing direction can make an in-plane angle of α° to the longitudinal direction (see FIG. 1(a)).

The pushing depth 9 of the rubbing roller 2 is appropriately set so that the liquid crystal molecules can be oriented in the rubbing direction. The pushing depth 9 is preferably from 10 to 50 mm. When the pushing depth 9 is in this range, the liquid crystal molecules can be easily oriented in a direction coincident with the rubbing direction 7, which is preferred. In this context, as shown in FIG. 1(b), the pushing depth 9 means the amount of pushing the rubbing roller against the retardation film from the starting point (the amount of change in position), wherein the starting point is the position of the long retardation film before the rubbing roller comes into contact with it.

The rubbing cloth may be any raising cloth without limitation. The material, shape, or other features of the raising cloth may be appropriately selected depending on the material to be rubbed. For example, the raising cloth is usually made of cotton, rayon, nylon, triacetate, or the like. The type, size, or other features of the rubbing roller 2 are also not restricted.

A series of procedures for the rubbing are further described in detail. For example, the long retardation film 1 is supported under a predetermined tension between the first guide roller 3 and the second guide roller 4. On the other hand, the rubbing roller 2 is held on standby above (not in contact with) the long retardation film 1. The rubbing roller 2 is then rotated in the horizontal direction, and the desired rubbing angle is set as shown in FIG. 1(a). Subsequently, the rubbing roller 2 is lowered to a predetermined position to come into contact with the upper surface of the long retardation film 1. The long retardation film 1 is fed in the direction from the guide roller 3 to the guide roller 4 under a predetermined tension at a predetermined rate using an appropriate feeding and driving apparatus (not shown), and the rubbing roller is rotated at a predetermined speed, so that the upper surface of the long retardation film 1 is continuously rubbed.

The feed speed of the long retardation film 1 and the rotational speed of the rubbing roller are not restricted. Preferably, the rotational speed of the rubbing roller 2 is sufficiently higher than the feed speed of the long retardation film 1.

(3) Step (C)

The step (C) is the step of forming a coating of a liquid crystal compound solution in an isotropic phase state on the rubbed surface of the long retardation film obtained in the step (B) and solidifying the coating to form a long polarizing coating in which the liquid crystal compound is oriented.

The liquid crystal compound may be a lyotropic or thermotropic liquid crystal compound. Preferably, the liquid crystal compound is a lyotropic liquid crystal compound. As used herein, the term "lyotropic liquid crystal compound" refers to a liquid crystal compound that can be dissolved in a solvent to form a liquid crystal compound solution and can undergo a phase transition from an isotropic phase to a liquid crystalline phase (or vice versa) as the concentration of its solution changes. In this context, the concentration at which the non-liquid-crystalline state (isotropic phase) changes to the liquid crystalline state (liquid crystalline phase) is referred to as the "isotropic-phase-to-liquid-crystalline-phase transition concentration." As used herein, the term "thermotropic liquid crystal compound" refers to a liquid crystal compound that can thermally undergo a phase transition from an isotropic phase to a liquid crystalline phase (or vice versa). In this context, the temperature at which the non-liquid-crystalline state (isotropic phase) changes to the liquid crystalline state (liquid crystalline phase) is referred to as the "isotropic-phase-to-liquid-crystalline-phase transition temperature."

In the invention, therefore, the "liquid crystal compound solution in an isotropic phase state" may be specifically a liquid crystal compound solution diluted to a concentration lower than the isotropic-phase-to-liquid-crystalline-phase transition concentration or may be specifically a liquid crystal compound solution having a temperature higher than the isotropic-phase-to-liquid-crystalline-phase transition temperature and not being liquid crystalline (or being in an isotropic phase).

The lyotropic liquid crystal compound solution for use in the invention usually contains a lyotropic liquid crystal compound and a solvent in which the lyotropic liquid crystal compound is soluble. For example, the lyotropic liquid crystal compound may be an azo compound, an anthraquinone compound, a perylene compound, a quinophthalone compound, a naphthoquinone compound, a melocyanine compound, or the like. In particular, an azo compound is preferred.

For example, the azo compound may be an azo compound represented by the following general formula (1).

[Formula (1)]

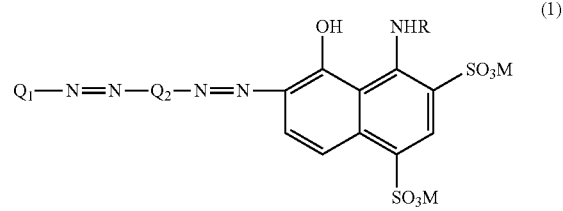
(1)

In formula (1), $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group (these groups may have any substituent groups); and M is a counter ion.

M is a counter ion and is preferably a hydrogen atom, an alkali metal atom, an alkali earth metal atom, a metal ion or a substituted or unsubstituted ammonium ion thereof. Examples of a metal ion include, for example, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, or $Ce^{3+}$ and the like. When the counter ion M is a multivalent ion, a plurality of azo compounds share one multivalent ion (counter ion).

The azo compound is preferably represented by the following general formula (2). In the formula (2), R and M are the same as those in the formula (1). X is a hydrogen atom, a halogen atom, a nitro group, a cyano croup, an alkyl group having 1 to 4 carbon atoms, an alkoxy group having 1 to 4 carbon atoms, or —$SO_3M$ group.

[Formula (2)]

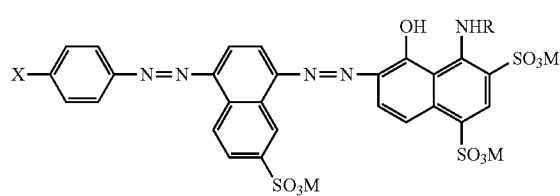

(2)

For example, the azo compound can be produced by the method described in JP-A-2009-173849.

The solvent may be of any type capable of dissolving the lyotropic liquid crystal compound. Preferably, the solvent is a hydrophilic solvent. Examples of the hydrophilic solvent include water, alcohols, cellosolves, and any mixture thereof. In particular, water is preferred. The solvent may also contain a water-soluble compound such as glycerin or ethylene glycol.

The concentration of the lyotropic liquid crystal compound solution is lower than the isotropic-phase-to-liquid-crystalline-phase transition concentration. In other words, the lyotropic liquid crystal compound solution is in a non-liquid-crystalline state (isotropic phase). When such a lyotropic liquid crystal compound solution is used, the liquid crystal compound can be easily oriented parallel or perpendicular to the rubbing direction without being influenced by the shear stress during the coating process.

The concentration of the lyotropic liquid crystal compound solution may be at any level lower than the isotropic-phase-to-liquid-crystalline-phase transition concentration without limitation. In general, the concentration of the lyotropic liquid crystal compound solution is preferably from 1 to 10% by weight based on the total weight of the solution. The lyotropic liquid crystal compound solution may be applied by any method capable of forming a uniform coating. For example, the solution may be applied using a wire bar, a gap coater, a comma coater, a gravure coater, a tension web coater, a slot die, or the like.

After the lyotropic liquid crystal compound solution is applied, the concentration of the solution is changed so that the solution undergoes a phase transition from an isotropic phase to a liquid crystalline phase, and thus the liquid crystal molecules are oriented to form a long polarizing coating. The method for changing the concentration of the solution may be, but not limited to, a natural drying method or a heat drying method.

The thermotropic liquid crystal compound solution for use in the invention usually contains a thermotropic liquid crystal compound and a solvent in which the thermotropic liquid crystal compound is soluble. The solvent and applying method of the thermotropic liquid crystal compound solution are same as those of the lyotropic liquid crystal compound solution. When the thermotropic liquid crystal solution is used, the solution undergoes a phase transition from an isotropic phase to a liquid crystalline phase as its temperature changes, so that the liquid crystal molecules are oriented to form a long polarizing coating. The temperature for the phase transition may be appropriately selected depending on the type of the liquid crystal compound used.

The concentration of the liquid crystal compound in the long polarizing coating formed in the step (C) is preferably from 80 to 100% by weight based on the total weight of the long polarizing coating. The thickness of the long polarizing coating is preferably from 0.1 to 10 μm, more preferably from 0.1 to 5 μm.

The long polarizing coating formed in the step (C) exhibits absorption dichroism at at least one wavelength in the visible light region and has an absorption axis in an in-plane direction. The absorption dichroism is obtained when the liquid crystal compound is oriented in the long polarizing coating. The direction of the absorption or transmission axis of the long polarizing coating makes an angle of 25 to 65° to the longitudinal direction.

2. Long Laminated Polarizing Plate

The long laminated polarizing plate of the invention includes a long retardation film 1 having a slow axis in its longitudinal direction and a long polarizing coating 10 having an absorption axis or a transmission axis in an in-plane direction at an angle of 25 to 65° to the slow axis direction of the long retardation film 1, wherein the long retardation film has an Nz coefficient of 1.5 or less, wherein the Nz coefficient is expressed by the formula (nx−nz)/(nx−ny), wherein nx is the maximum in-plane refractive index of the film, ny is the in-plane refractive index of the film in a direction perpendicular to the direction in which nx is obtained, and nz is the refractive index of the film in its thickness direction; the long retardation film has a surface rubbed in an in-plane direction at an angle of 20 to 70° to the longitudinal direction; and the long polarizing coating is formed by coating directly on the rubbed surface of the long retardation film.

As used herein, the term "formed by coating directly on" means that the long polarizing coating is formed directly on the long retardation film with no adhesive. As used herein, the term "long" means that the length is sufficiently larger than the width, and preferably, the length is ten times or more the width.

The long laminated polarizing plate of the invention can be manufactured by the method of the invention described above, while it may be manufactured by other methods. The materials, the thickness, and other features of the long retardation film and the long polarizing coating may be those described above.

The long laminated polarizing plate of the invention preferably has a length of 300 m or more. The long laminated polarizing plate preferably has a total thickness of 20 to 200 μm.

The angle between the slow axis direction of the long retardation film and the absorption or transmission axis direction of the long polarizing coating (the angle β in FIG. 2(b)) is preferably from 25 to 65°, more preferably from 30 to 60°. When the angle is set in this manner, a long circularly polarizing plate can be obtained, with which circularly polarized light can be produced from linearly polarized light incident in a specific direction at any wavelength in the visible light region (wavelengths from 380 to 780 nm), which is preferred.

3. Applications

For example, the long laminated polarizing plate obtained according to the invention may be used in liquid crystal displays or organic EL displays.

EXAMPLES

Hereinafter, the invention is described with reference to the examples below, which however are not intended to limit the invention.

<Measurement Methods>

In each of the examples and the comparative examples described below, the measurement methods described below were used for determination and evaluation.

(1) Measurement of Thickness

The thickness was measured using a digital gauge (PEACOCK (product name) manufactured by OZAKI MFG. CO., LTD.).

(2) Determination of Slow Axis, In-Plane Retardation, and Hz Coefficient of Long Retardation Film and Angles of Absorption Axis and Transmission Axis of Long Polarizing Coating These were determined at 23° C. using KOBRA-WPR (trade name) manufactured by Oji Scientific Instruments. The measurement was performed at a wavelength of 590 nm.

Production Example 1

Preparation of Aqueous Lyotropic Liquid Crystal Solution

In accordance with a conventional method ("Riron Seizo Senryo Kagaku (Theoretical production Dye Chemistry)" Fifth Edition, Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to diazotization and coupling reaction with 1-amino-8-naphthol-2,4-disulfonate lithium salt. An obtained rough product including an azo compound having the following structural formula (3) was salted out with lithium chloride to obtain the azo compound having the following structural formula (3).

[Formula (3)]

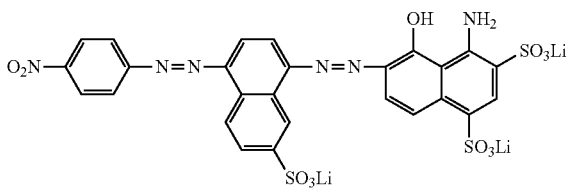

The azo compound of the aforementioned structural formula (3) was dissolved in ion-exchange water to prepare an aqueous lyotropic liquid crystal solution of 8% by weight.

Example 1

A cycloolefin polymer film was stretched to form a long retardation film having a slow axis parallel to its longitudinal direction and having an Nz coefficient of 0.4. The resulting long retardation film had an in-plane retardation of 140 nm.

While the resulting long retardation film was fed, the surface of the film was rubbed by the same method as shown in FIG. 1(a) in such a manner that the rubbing direction (α) was 45° (the pushing depth of the rubbing roller: 15 mm, rubbing cloth: rayon cloth). The 8% by weight lyotropic liquid crystal aqueous solution in an isotropic phase prepared in Production Example 1 was then applied to the rubbed surface of the long retardation film with a tension web coater, and the solution was naturally dried to form a 0.4-μm-thick long polarizing coating. The lyotropic liquid crystal is oriented in such a manner that the long axis direction of its molecules is substantially perpendicular to the rubbing direction. Thus, the lyotropic liquid crystal is oriented in such a manner that its transmission axis direction is substantially parallel to the rubbing direction. The longitudinal direction of the resulting long circularly polarizing plate was at an angle of 42° to the transmission axis direction of the long polarizing coating. Thus, the transmission axis direction was deviated by an angle of 3° from the rubbing direction.

Example 2

A cycloolefin polymer film was stretched to form a long retardation film having a slow axis parallel to its longitudinal direction and having an Nz coefficient of 1.0. The resulting long retardation film had an in-plane retardation of 140 nm.

A long circularly polarizing plate was prepared by the same method as in Example 1, except that the obtained long retardation film with an Nz coefficient of 1.0 was used. The longitudinal direction of the resulting long circularly polarizing plate was at an angle of 41° to the transmission axis direction of the long polarizing coating. Thus, the transmission axis direction was deviated by an angle of 4° from the rubbing direction.

Comparative Example 1

A cycloolefin polymer film was stretched to form a long retardation film having a slow axis parallel to its longitudinal direction and having an Nz coefficient of 1.6. The resulting long retardation film had an in-plane retardation of 140 nm.

A long circularly polarizing plate was prepared by the same method as in Example 1, except that the obtained long retardation film with an Nz coefficient of 1.6 was used. The longitudinal direction of the resulting long circularly polarizing plate was at an angle of 27° to the transmission axis direction of the long polarizing coating. Thus, the transmission axis direction was deviated by an angle of 18° from the rubbing direction.

Comparative Example 2

A cycloolefin polymer film was stretched to form a long retardation film having a slow axis parallel to its longitudinal direction and having an Nz coefficient of 1.8. The resulting long retardation film had an in-plane retardation of 140 nm.

A long circularly polarizing plate was prepared by the same method as in Example 1, except that the obtained long retardation film with an Nz coefficient of 1.8 was used. The longitudinal direction of the resulting long circularly polarizing plate was at an angle of 25° to the transmission axis direction of the long polarizing coating. Thus, the transmission axis direction was deviated by an angle of 20° from the rubbing direction.

DESCRIPTION OF REFERENCE SIGNS

1 Long retardation film
2 Rubbing roller
2a Rotation axis
3 First guide roller
4 Second guide roller
5 Slow axis direction
6 Longitudinal direction
7 Rubbing direction
8 Feed direction
9 Pushing depth
10 Long polarizing coating
11 Liquid crystal molecule
12 Direction of absorption axis (Long axis direction of molecule)

The invention claimed is:

1. A method for manufacturing a long laminated polarizing plate comprising a long retardation film having a slow axis in its longitudinal direction and a long polarizing coating placed on the retardation film and having an absorption axis or a transmission axis in an in-plane direction at an angle of 25 to 65° to the slow axis direction of the long retardation film,
the method comprising the steps:
(A) preparing a long retardation film having a slow axis in its longitudinal direction and having an Nz coefficient of 1.5 or less, wherein the Nz coefficient is expressed by the formula (nx−nz)/(nx−ny), wherein nx is a maximum in-plane refractive index of the film, ny is an in-plane refractive index of the film in a direction perpendicular to the direction in which nx is obtained, and nz is a refractive index of the film in its thickness direction;
(B) rubbing the long retardation film, which is obtained in the step (A), in an in-plane rubbing direction at an angle of 20 to 70° to the longitudinal direction while feeding the long retardation film; and
(C) coating the rubbed surface of the long retardation film obtained in the step (B) with a liquid crystal compound solution in an isotropic phase state, and solidifying the liquid crystal compound solution to form a long polarizing coating in which the liquid crystal compound is oriented such that an absorption axis or a transmission axis of the long laminated polarizing plate is deviated by an angle of about 0°±5° from the in-plane rubbing direction.

2. The method according to claim 1, wherein the liquid crystal compound solution in an isotropic phase state is a lyotropic liquid crystal compound solution diluted to a concentration lower than an isotropic-phase-to-liquid-crystalline-phase transition concentration.

3. The method according to claim 2, wherein the rubbing in the step (B) is performed by bringing a rotating rubbing roller into contact with the long retardation film being fed.

4. The method according to claim 2, wherein the lyotropic liquid crystal compound is an azo compound having the following general formula (1):

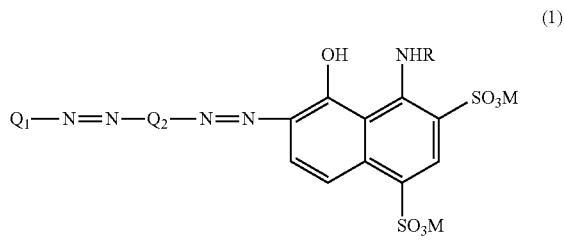

(1)

wherein $Q_1$ is an aryl group; $Q_2$ is an arylene group; R is a hydrogen atom, an alkyl group having 1 to 3 carbon atoms, an acetyl group, a benzoyl group, or a phenyl group; and M is a counter ion.

5. The method according to claim 4, wherein M is a counter ion selected from the group consisting of a hydrogen atom, an alkali metal atom, an alkali earth metal atom, a metal ion, and a substituted or unsubstituted ammonium ion thereof.

6. The method according to claim 2, wherein the lyotropic liquid crystal compound is an azo compound having the following general formula (2):

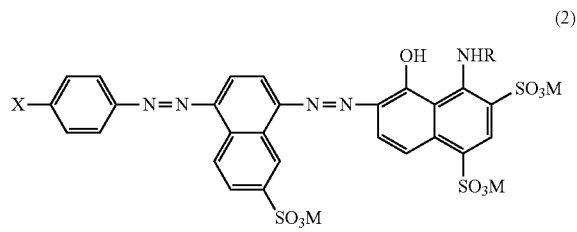

(2)

wherein X is a hydrogen atom, a halogen atom, a nitro group, a cyano group, an alkyl group having 1 to 4 carbon atoms, an alkoxy group having 1 to 4 carbon atoms, or a $SO_3M$ group; R is a hydrogen atom, an alkyl group having 1 to 3 carbon atoms, an acetyl group, a benzoyl group, or a phenyl group; and M is a counter ion.

7. The method according to claim 6, wherein M is a counter ion selected from the group consisting of a hydrogen atom, an alkali metal atom, an alkali earth metal atom, a metal ion, and a substituted or unsubstituted ammonium ion thereof.

8. The method according to claim 1, wherein the rubbing in the step (B) is performed by bringing a rotating rubbing roller into contact with the long retardation film being fed.

9. The method according to claim 1, wherein the Nz coefficient of the long retardation film is less than 1.0.

10. The method according to claim 9, wherein the Nz coefficient of the long retardation film is from 0 to 0.5.

11. The method according to claim 1, wherein the long retardation film is prepared to have an Nz coefficient from 0.4 to 1.0 in the step (A).

* * * * *